US008647201B1

(12) United States Patent
Jehamy et al.

(10) Patent No.: US 8,647,201 B1
(45) Date of Patent: Feb. 11, 2014

(54) FANTASY LEAGUE AGGREGATION SYSTEM

(71) Applicant: Fantasy League Crunch LLC, San Diego, CA (US)

(72) Inventors: Alan Elie Jehamy, San Diego, CA (US); Marc Wornovitzky, San Diego, CA (US); Ilan Wornovitzky, San Diego, CA (US)

(73) Assignee: Fantasy League Crunch LLC., San Diego, CA (US)

( * ) Notice: Subject to any disclaimer, the term of this patent is extended or adjusted under 35 U.S.C. 154(b) by 0 days.

(21) Appl. No.: 13/913,325

(22) Filed: Jun. 7, 2013

(51) Int. Cl.
*A63F 13/00* (2006.01)

(52) U.S. Cl.
USPC ........... 463/31; 463/4; 463/9; 463/42; 700/91

(58) Field of Classification Search
USPC .................................................. 463/4, 40, 42
See application file for complete search history.

(56) References Cited

U.S. PATENT DOCUMENTS

| | | | |
|---|---|---|---|
| 4,918,603 A | 4/1990 | Hughes et al. | |
| 5,846,132 A | 12/1998 | Junkin | |
| 7,001,279 B1 | 2/2006 | Barber et al. | |
| 7,614,944 B1 | 11/2009 | Hughes et al. | |
| 7,618,312 B1 | 11/2009 | Kasten | |
| 7,699,707 B2 | 4/2010 | Bahou | |
| 7,827,202 B2 | 11/2010 | Relyea et al. | |
| 7,985,134 B2 | 7/2011 | Ellis | |
| 8,052,521 B2 | 11/2011 | Webb et al. | |
| 8,099,182 B1 | 1/2012 | Kasten | |
| 8,105,159 B2 | 1/2012 | Robinson et al. | |
| 8,176,518 B1 | 5/2012 | Junkin et al. | |
| 8,192,260 B2 | 6/2012 | Fleming | |
| 8,210,916 B2 | 7/2012 | Ma et al. | |
| 8,366,551 B2 | 2/2013 | Thomas | |
| 8,403,756 B2 | 3/2013 | Baray et al. | |
| 2002/0107073 A1 | 8/2002 | Binney | |
| 2006/0046807 A1* | 3/2006 | Sanchez | 463/9 |
| 2006/0183547 A1 | 8/2006 | McMonigle | |
| 2006/0183548 A1 | 8/2006 | Morris et al. | |
| 2006/0252476 A1 | 11/2006 | Bahou | |
| 2007/0021165 A1 | 1/2007 | Ma et al. | |
| 2007/0021167 A1 | 1/2007 | Ma et al. | |
| 2007/0021214 A1 | 1/2007 | Ma et al. | |
| 2007/0021853 A1 | 1/2007 | Ma et al. | |
| 2007/0022029 A1 | 1/2007 | Ma et al. | |
| 2007/0060380 A1 | 3/2007 | McMonigle et al. | |
| 2007/0100891 A1 | 5/2007 | Nee | |
| 2008/0026804 A1 | 1/2008 | Baray et al. | |

(Continued)

*Primary Examiner* — Paul A D'Agostino
*Assistant Examiner* — Ankit Doshi
(74) *Attorney, Agent, or Firm* — ARC IP Law, PC; Joseph J. Mayo

(57) ABSTRACT

One or more embodiments of the invention are related to a fantasy league aggregation system with a processor to bidirectionally communicate with a plurality of external servers, accept a first set of sports league data from a first user and accept a second set of sports league data from the plurality of external servers. The processor combines the first user selection and the second set of sports league data, displays an aggregate view of the combination with a player favorability view for one or more league players including a plurality of player strength categories associated with each player such as a list of players for the first user, a list of players favorable to the first user, a list of players neutral to the first user, a list of players that are unfavorable to the first user and a list of players that are against the first user.

20 Claims, 6 Drawing Sheets

(56) References Cited

U.S. PATENT DOCUMENTS

| | | |
|---|---|---|
| 2008/0062318 A1 | 3/2008 | Ellis et al. |
| 2008/0064490 A1 | 3/2008 | Ellis |
| 2008/0066111 A1 | 3/2008 | Ellis et al. |
| 2008/0096664 A1 | 4/2008 | Baray et al. |
| 2008/0268951 A1 | 10/2008 | Gropp et al. |
| 2009/0066028 A1 | 3/2009 | Kimble |
| 2009/0082110 A1 | 3/2009 | Relyea et al. |
| 2009/0082111 A1 | 3/2009 | Smith et al. |
| 2009/0083322 A1 | 3/2009 | Relyea et al. |
| 2009/0181738 A1 | 7/2009 | Costin et al. |
| 2009/0291750 A1 | 11/2009 | Herrmann |
| 2009/0325685 A1 | 12/2009 | Webb et al. |
| 2010/0093415 A1 | 4/2010 | Kasten |
| 2010/0137057 A1 | 6/2010 | Fleming |
| 2010/0210330 A1 | 8/2010 | Fleming |
| 2010/0279774 A1 | 11/2010 | Braig et al. |
| 2011/0028206 A1 | 2/2011 | Charchian |
| 2011/0028221 A1 | 2/2011 | Relyea et al. |
| 2011/0183731 A1 | 7/2011 | Barry |
| 2011/0230243 A1 | 9/2011 | Hereford et al. |
| 2011/0237317 A1 | 9/2011 | Nooran et al. |
| 2011/0256910 A1 | 10/2011 | Sloan |
| 2011/0281620 A1 | 11/2011 | Hays |
| 2011/0313793 A1 | 12/2011 | LaGiglia et al. |
| 2012/0052930 A1 | 3/2012 | McGucken |
| 2012/0231890 A1 | 9/2012 | Junkin et al. |
| 2012/0270614 A1 | 10/2012 | Robinson et al. |
| 2012/0282995 A1 | 11/2012 | Allen et al. |
| 2012/0289340 A1 | 11/2012 | Pawson |
| 2012/0316659 A1* | 12/2012 | Magas .......... 700/91 |
| 2012/0317046 A1 | 12/2012 | Myslinski |
| 2012/0329541 A1 | 12/2012 | Allen et al. |
| 2013/0005419 A1 | 1/2013 | Sediq |
| 2013/0045805 A1 | 2/2013 | Pennington et al. |
| 2013/0060757 A1 | 3/2013 | Myslinski |
| 2013/0079073 A1 | 3/2013 | Sharifi |

* cited by examiner

FIGURE 3

USER XYZ

LEAGUE 1 - On | LEAGUE 2 - On                    301

| QB | Teams For/Not | RB | Teams For/Not | WR | Teams For/Not |
|---|---|---|---|---|---|
| ++Rodgers | 4 | McCoy | 2 | Welker | 3 |
| Manning | 3 | Ridley | 2 | ⋮ | ⋮ |
| ⋮ |  |  |  |  |  |
| + Ryan | 3-1 | Brown | 2-1 |  |  |
| 0 Brees | 1-1 | White | 1-1 |  |  |
| - Romo | 1-2 | Thomas | 1-3 |  |  |
| - -Brady | -3 | Gore | -2 |  |  |

303a — ++Rodgers
303b — + Ryan
303c — 0 Brees
303d — - Romo
303e — - -Brady

302

FANTASY LEAGUE AGGREGATION SYSTEM

BACKGROUND OF THE INVENTION

1. Field of the Invention

One or more embodiments of the invention are related to fantasy league systems. More particularly, but not by way of limitation, at least one embodiment of the invention compares or otherwise combines the first user's fantasy teams in multiple leagues with the additional user's fantasy teams and displays an aggregate view of the combination with a player favorability view for fantasy league players. The aggregate view may include a fine-grained display such as lists of players that are "for", i.e., only playing on fantasy teams for the first user, and playing on more teams for the first user than for the additional users and hence are favorable to the first user, and playing on an equal number of the first user's and additional user's teams and that are neutral to the first user, and playing on less teams for the first user than for the additional users and hence are unfavorable to the first user and only on the additional user's fantasy teams and hence are against the first user. Other embodiments may display a coarse-grained list of for/against or other subset or grouping of the fine-grained display for example. Embodiments thus enable a user to determine whether a current player performance should be cheered for or not at that moment, or is helping or hurting the overall fantasy performance of the user based on the related fantasy ownership of the player with respect to additional users.

2. Description of the Related Art

Generally, fantasy leagues are common. There are many types of fantasy leagues that enable users to compete by picking players and forming teams related to sports, games, notoriety and many other characteristics. For example, sports fantasy leagues involve sports such as football, baseball, soccer, hockey, golf, cricket, auto racing, surfing, etc., and allow users to pick players to form their own team to compete against other users based on player performances, statistics, scores or a myriad of other types of values including simple head to head matchups. Game fantasy leagues involve games such as poker, blackjack, etc., and enable users to pick players to form their own team and compete against other users. Celebrity fantasy leagues enable users to pick a group of celebrities wherein scores are related to the number of pictures of celebrities that appear in various magazines.

Many sports fans are involved in multiple fantasy leagues for various sports. Current fantasy systems are generally standalone systems that do not provide information related to more than one league that a specific player is involved with in a meaningful or helpful manner. For example, there are no known systems that provide a display that informs a user whether to cheer or not if a specific player scores since that player may be on more opposing fantasy teams in various leagues that the user is involved with and that ratio of for/against can change every week. Hence, if a particular player scores a touchdown in a given game, a user may be informed to cheer since the user has the player on more fantasy teams that other players. However, if the same player scores again in a different game at a later date, other users may have drafted or traded for the player, meaning that the user should not cheer for the player at that later date since a touchdown from the player is hurting the user's fantasy league performance overall as the user owns the player less than other users over multiple leagues.

Known systems for sports fantasy leagues, accessible via mobile computers and/or web-applications, typically use algorithms and computations to help a user determine best player picks for a specific fantasy league. In addition, existing systems may display trade recommendations in one or more leagues using information associated with the values of one or more players. The values of one or more players are typically computed using statistical methods such as a player position, period of time, points, etc., and using projected statistics to rank players from best to worst for a given fantasy league. These systems are generally involved with the problem of obtaining or maintaining team rosters based on player performance, but they are incapable of displaying relative value of a player's performance with respect to a first user versus additional user's since the player may be on several fantasy teams associated with the first user as well as several fantasy teams associated with additional users in multiple leagues that the first user is in. Hence, these systems cannot readily determine if the first user is relatively benefiting from a player performance or not, for example if a particular player scores a touchdown, existing systems are unable to notify a user whether to cheer or not based on the various overall leagues that the user is in with respect to that player's ownership by other users in multiple leagues.

For example, United States Patent Publication 20120329541 to Allen et al., entitled "Fantasy Sports Neural Engine and Method of Using Same", discloses a neural engine that sums all leagues and determine best player pick using algorithms, computations, etc., to best simulate human reasoning, and pattern recognition. The network appears to be accessible and used on PCs, mobile phones, etc., and used for any recreational activity/sport. The system also appears to use historical performance information for at least two fantasy sports teams in at least two fantasy sports leagues, wherein the at least two leagues are associated with one sports draft; to arrive at a recommendation. The system also appears to use a trade comparator for trade recommendations in one or more leagues in one draft, and information regarding the values of the players in the leagues.

It appears as though the system of Allen et al. recognizes that a user in one league will participate in the same league for years, or multiple users in one league will play together in a different league, therefore all players' histories are stored and projected across all leagues for all years. In other words, all player statistics across multiple leagues are accessible by the neural engine to provide a better projection on what each player on each team is likely to do once drafted. Also, one member (user) appears to have access to all player statistics in the multiple leagues the member (user) is associated with, to assess player projections and tendencies across multiple leagues.

In addition, the neural engine of Allen et al. is capable of averaging, for example using a weighted average, of all statistical lists and projections across multiple leagues and teams to assess a likely good draft list of players. The neural engine appears to suggest tendencies, favorite players, favorite teams, and favorite positions of other teams in the league, including an opposing user's history. The engine suggests that the list provided may be used by an opposing member, and suggests a different pick. For example, the engine may provide prediction percentages of the chance an opposing member will choose a running back, wide receiver, etc. on an American Football fantasy league. In summary this system appears to be directed at the initial pick or trading of players and not displaying how the players are favorable versus other user's players, for example during a game. Hence, there is no way to know whether to celebrate a player's performance or not since although a user may have a particular player in multiple leagues, other users of varying numbers may also have the player.

The drawbacks of using such a neural engine is that the neural engine does not appear to use data accumulation to present a single interface showing player favorability from aggregated data. In addition, the engine does not appear to weight the players' and teams statistics to a user's (member) points, in order to determine favorability, without the need to include an opposing member's league data. Although the engine is capable of aggregating data across multiple leagues, for a single user, the engine does not appear to provide statistical recommendations as to whether a specific player from a specific team will hurt or help a specific user (member), based on the single user's points/history. For example, the engine may provide prediction percentages of the chance an opposing member will choose or draft a running back, wide receiver, etc., but not in regards to a specific player, of a specific position on a specific team, and not with respect to whether the player's current performance is beneficial to the first user or not based on the number of other user's which have already drafted the player in the multiple leagues the first user has a fantasy team in.

United States Patent Publication 20110237317 to Nooran et al., entitled "Apparatus and Method for Recommending Roster Moves In Fantasy Sports Teams", discloses a roster modification recommendation system for fantasy sports leagues. The system appears to use projected statistics on one or more players, on one team or several teams. The system mentions various statistical methods, such as position, period of time, etc, for recommending trade or acquisition to the user. The system is able to accumulate statistics (for a game, week, month, etc) and compare those to similar statistics of other fantasy teams in one league, or many leagues. For example, the system allows users to communicate with a server (web, app, etc) to get information on players and teams in one or more fantasy leagues owned by the same user. The system also appears to use statistics to determine scoring, project player statistics for specific players, using point projections in a specific league. The system may also compute demand for a player, using movement of players in other leagues, and provide a recommendation to the user.

While the system appears to disclose the use of multiple leagues for a single user, and accumulating data from the multiple leagues, the system does not specifically state whether the recommendations are based on a user's current and/or past history points for a specific player, and does not specifically aggregate data on a single player on a single interface, by stating whether a specific player is favored or "unfavored", associated with the user's historical moves, data, points, etc. The system is more geared towards comparisons of other leagues, to recommend a move on a single league, rather than a specific player, and for example does not indicate whether a particular performance by a particular player is something worth cheering about, or otherwise indicating whether the performance hurts or helps the user based on all of the leagues that the user has fantasy teams in.

United States Patent Publication 20110230243 to Hereford et al., entitled "Fantasy Sports Engine for Recommending Optimum Team Rosters", appears to disclose the use of multiple leagues and recommends whether a user should add/drop/trade players based on computations, for each league. However, the system of Hereford et al., does not appear to view statistics, history, etc., of each player across multiple leagues at once.

United States Patent Publication 20130045805 to Penning et al., entitle "Fantasy Sports Leagues Comprising Historical Players and/or Historical Results", appears to use multiple leagues in one application/server, however does not appear to provide recommendations using data aggregation across leagues for the same user, or indications as to whether a particular player's performance helps or hurts the overall fantasy league performance of a user having multiple fantasy teams in multiple leagues wherein the player may be on multiple other user's fantasy teams.

United States Patent Publication 20120270614 to Robinson et al., entitled "Method for Playing Fantasy Sports", appears to disclose a system that uses multiple teams/leagues and multiple players, and ranks all players across teams/leagues, individually. However, the system does not appear to aggregate players across leagues for a single user.

United States Patent Publication 20090082111 to Smith et al., entitled "System and Method for Connecting Users Based on Common Interests, Such As Shared Interests of Representations of Professional Athletes" appears to disclose a system connected to various sites, and aggregates data from the multiple sites. However, it appears that the multiple sites are not necessarily associated with the user's leagues and points, but rather other users' data/league information.

United States Patent Publication 200800268951 to Gropp et al., entitled "Data Visualization System for Fantasy Sporting Events", appears to disclose a system that views and compares statistics of various players, teams and leagues using a single interface, and ranks players from overall statistics. However, the system does not appear to provide an interface to the user for ranking or otherwise displaying the players in terms of overall favorability, "unfavorability", etc. over the user's points, with respect to whether the player is on more, less or equal number of other user's fantasy teams for example.

In summary, there are no known systems that utilize a fantasy league aggregation system to use data accumulation to present a single interface showing player favorability from aggregated data, and weight the players' and teams statistics to a user's points, in order to determine favorability, without the need to include an opposing member's league data. In addition, there are no known system that are capable of aggregating data across multiple leagues, for a single user and provide statistical recommendations as to whether a specific player from a specific team is hurting or helping a specific user, based on the single user's points/history, in regards to a specific player, of a specific position on a specific team. With the popularity of fantasy sports leagues, a fan may be involved in several leagues, making it difficult to know if a specific player within each league is currently helping or hurting the first user's overall fantasy teams in multiple leagues for example. Hence there is a need for a fantasy league aggregation system that presents a combined view of all the user's sports fantasy leagues and organizes the leagues in a manner allowing a user to determine whether a specific player is all for, favorable, neutral, unfavorable or all against a user versus opponent users fantasy teams.

BRIEF SUMMARY OF THE INVENTION

One or more embodiments described in the specification are related to sports league data systems, specifically a sports fantasy league data aggregation system including a processor and generally multiple disparate fantasy sports databases hosted on various external servers for example. In at least one embodiment of the invention, the processor may be configured to operate as a web-based application or an "app" on mobile computers such as laptop computers, notebook computers, tablet computer, Personal Digital Assistants and Smart phones.

In one or more embodiments, the processor bidirectionally communicates with a plurality of external servers using a bidirectional communication link, accepts a first set of a plurality of sports league data from a first user, and accepts a second set of a plurality of sports league data from the plurality of external servers associated with one or more additional users. The bidirectional communication link may include a receiver, transmitter, transceiver, antenna, USB cable, any other type of wireless link, any other type of hardwired communication link, or any combination thereof. In at least one or more embodiments, the processor may accept a first set of a plurality of sports league data from a first user, e.g., accept input using a mobile computer or a web-based application, or voice recognition input using a mobile computer or a web-based application. In one or more embodiments of in the invention, the plurality of external servers may be one or more of at least one television network server, at least one web-based league data server and at least one mobile computer league data or any other type of server capable of storing fantasy league data for example.

By way of one or more embodiments, each of the first set of a plurality of sports league data and the second set of a plurality of sports league data includes at least one or more leagues the first user and the one or more additional users are associated with respectively, and wherein each of the one or more leagues the first user and the one or more additional users are associated with include one or more fantasy teams, one or more players within each of the one or more fantasy teams, player statistics associated with each of the one or more players and player achievements associated with each of the one or more players.

In at least one or more embodiments, the processor may accept a first user selection from the first user, combine the first user selection and the second set of a plurality of sports league data from the plurality of external servers, and display an aggregate view of the combination. The first user selection may include one or more selections from the first set of a plurality of sports league data, and wherein the first user selection may include the one or more leagues the first user is associated with and the one or more players the first user has previously selected with within the one or more leagues. For example, the first user selection or the second user selection may include a selection of a plurality of leagues from the one or more leagues the user is associated with. In addition, for example, the first user selection from the first user may include one or more of a user selection of one or more players and a user selection of one or more leagues from the one or more leagues the first user is associated with.

In one or more embodiments of the invention, the aggregate view may include the player statistics of the one or more players associated with the first user, a combination of the player achievements from the first user selection and from the second set of a plurality of sports league data from the plurality of external servers associated with the one or more additional users, and a player favorability view of the one or more players. By way of one or more embodiments, the player favorability view may include a plurality of player strength categories associated with each player of the one or more players, such that the plurality of player strength categories includes a first player category, a second player category, a third player category, a fourth player category and a fifth player category.

According to one or more embodiments, each player category of the five player categories provides a list of favorability ratings based on the first user's selection of one or more players versus one or more players from the one or more additional users. In at least one or more embodiments, the first player category lists players that are for the first user and are only on one or more fantasy teams from one or more of fantasy teams associated with the first user and not the one or more additional users. The second player category lists players that are favorable to the first user and are on one or more fantasy teams from the one or more fantasy teams associated with the first user than are on one or more fantasy teams from the one or more fantasy teams associated with the one or more additional users. The third player category lists players that are neutral to the first user and are on the same number of fantasy teams from the one or more fantasy teams associated with the first user and the one or more additional users. The fourth player category lists players that are unfavorable to the first user and are on less fantasy teams from the one or more fantasy teams associated with the first user than are on fantasy teams from the one or more fantasy teams associated with the one or more additional users. The fifth player category lists players that are against the first user and are only on fantasy teams from the one or more fantasy teams associated with the first user and not associated with the one or more additional users. Other brief views may be utilized of "more for" or "more against" such that a coarser grained "cheer" or "no cheer" indication or favorability rating may be provided to the user alone or in combination with the five player category fine-grained favorability rating.

In at least one or more embodiments of the invention, the processor may also accept a second user selection from the first user, such that the second user selection could include one or more additional selections from the first set of a plurality of sports league data, different from the first user selection. For example, the first user selection may include a selection of one or more fantasy teams the first user is associated with, and the second user selection may include one or more players within the one or more fantasy teams.

By way of one or more embodiments, each of the first set of a plurality of sports league data and the second set of a plurality of sports league data may include one or more of American football, basketball, soccer, hockey, baseball, bowling, poker, billiards, or any other sport league data, whether professional, amateur, college or any other level, or any combination of sports league data as known to one of ordinary skill in the art. In one or more embodiments, each of the first set of a plurality of sports league data and the second set of a plurality of sports league data may include one or more of live-feedback data during a sports game and previous data attained during previous sports games.

For example, during a live sports game, live-feedback data may include points scored by one or more players and/or yardage attained by one or more players using the one or more of the plurality of external servers, which is automatically obtained by the fantasy league aggregation system processor for automatic updating. In one or more embodiments, the processor automatically updates the player favorability view using the second set of sports league data from one or more of the plurality of external servers, such as by updating one or more of the first player category, the second player category, the third player category, the fourth player category and the fifth player category. Embodiments may poll the external servers or sports feed websites or receive event based messages or any combination thereof in order to obtain the performance data. Embodiments may then display the fine-grained five category favorability rating or may display the coarse-grained two category favorability rating or both, or any other subset of the fine-grained category favorability rating as desired or tailored for the particular device display for example. In one or more embodiments, players may be active or benched, e.g., not playing in the particular matchup, and embodiments of the invention may display favorability with respect to active players that are asserted for the particular game for a particular user. This enables concise views for fantasy leagues having teams with depth or more players on each fantasy team that can or do play in a particular game for example.

According to at least one embodiment of the invention, the player favorability view may include a player statistics view. The play statistics view, for example, may have the player statistics associated with one or more of the players, and the player statistics associated with each of the one or more players may include a player name, the player team, the player position and a number of leagues the player is competing in. In one or more embodiments, the number of leagues a player is competing in may be determined from one or more of the first user selection from the first user and the second user selection from the first user, and may also be determined and selected by the first user using a user input and/or automatically generated using the one or more of the plurality of external servers.

By way of one or more embodiments, the player favorability view may also include a player achievements view that may contain player achievements associated with one or more of the players. The player achievements associated with each of the one or more players may include one or more of a player yardage, the player points scored during a game, the player catches, the player runs, the player passes, the player interceptions, or any other offensive or defensive play the player attains, or any other statistics related to the specific sport for example, or any combination thereof as one of ordinary skill in the art will recognize.

Other embodiments may also display a informatory message after a performance that enables the user to cheer or not cheer or otherwise inform additional user's as to the first user's fantasy team performance, e.g., a taunting message for the first user to relay or that is automatically texted or otherwise transmitted to the additional user or users such as "User XYZ's Fantasy Team moves up two spots in your Fantasy League based on your Fantasy Players relatively dismal performance today." Any other type or form of auto-taunt message may be presented by the system, e.g., selected from a list or by random by the system and presented to the user to approve and send for example without requiring the user to type in an extensive taunt, which provides more immediate communication with opponents.

In at least one embodiment of the invention, the processor may display a league view, such that the league view may include a list of one or more leagues from the one or more leagues, and wherein the processor may also enable the first user to select one or more leagues from the list to view in the league view and deselect one or more leagues from the list to not view in the league view. For example, if the first user is associated with three leagues, the first user is able to select a first league and a second league to view in the league view, and deselect a third league. In addition, for example, to compare sports league data, the first user is able to deselect any of the first league or second league, and select the third league, or select all three leagues. One of ordinary skill in the art will recognize that any other number of leagues is within the scope of the invention. In addition, embodiments of the system may display each week or day of the league performance depending on the game intervals for the specific sport, so that the user may scroll back and forward in time to view favorability of players over time for example.

According to one or more embodiments, the league view may include a display of time of contest, a display of the one or more players in each of the selected leagues the first user selects, a display of one or more active or bench players in each of the selected leagues the first user selects and a display of one or more opponent players in each of the selected leagues the first user selects. In one or more embodiments of the invention, the display of the one or more players includes a player name, a player team, a player position and a player points for each of the one or more players, and the display of one or more active or bench players includes a player name, a player team and a player position for each of the one or more players, and the display of one or more opponent players includes a player name, a player team, a player position and a player points for each of the one or more players. It is noted wherein each of the displays may further include any other sports league data information pertinent to the type of sport the first user is associated with. For example, one or more sports may not necessarily include any bench players, whereas other sports may include additional type of players such as a next batter up in baseball.

BRIEF DESCRIPTION OF THE DRAWINGS

The above and other aspects, features and advantages of the invention will be more apparent from the following more particular description thereof, presented in conjunction with the following drawings wherein:

FIG. 3 shows an exemplary favorability display associated with the user's fantasy players across multiple leagues versus additional user's fantasy players.

DETAILED DESCRIPTION OF THE INVENTION

A fantasy league aggregation system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
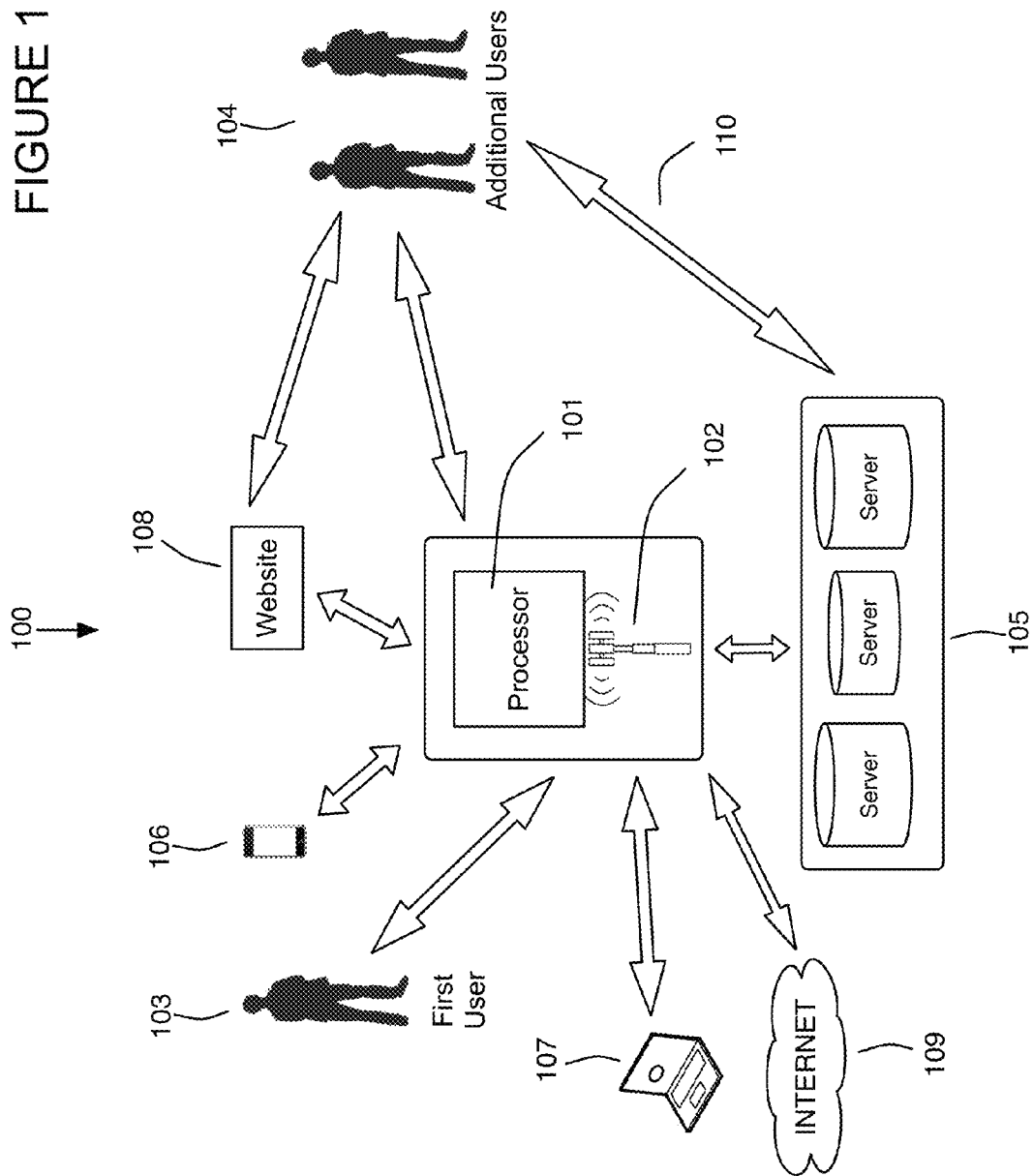
FIG. 1 shows an overall architecture diagram of the fantasy league aggregation system.

FIG. 1 shows an overall architecture diagram of the fantasy league aggregation system 100. One or more embodiments, the fantasy league aggregation system 100 includes a processor 101, for example that may host a website for the system, or otherwise provide access to aggregation information for the various sports fantasy leagues and teams therein for each user. Embodiments of the processor may charge for access to the aggregation system or otherwise provide advertisements or data mining capabilities. Alternatively, or in combination, processor 101 may be implemented as a personal computer for example, or processor 101 may reside within any of the other computers shown in FIG. 1. Processor 101 is shown as a separate component for exemplary purposes only as one skilled in the art will recognize as multi-processor architectures, distributed architectures, peer-to-peer architectures may also be utilized in keeping with the spirit of the invention. In addition, the system may include a bidirectional communication link 102, a first user 103, one or more additional users 104 and a plurality of external servers 105, wherein multiple disparate fantasy sports databases may be hosted on the various external servers 105, for example. In at least one embodiment of the invention, the processor 101 may operate as, may be associated with, and/or may be in bidirectional communication with, a web-based application or an "app" on mobile computers such Smart phones 106, laptop computers 107, or any other type of computer including but not limited to notebook computers, tablet PCs, Personal Digital Assistants, using the bidirectional communication link 102.

In one or more embodiments, the processor 101 bidirectionally communicates with the first user 103, the one or more additional users 104, mobile phone 106, mobile computer 107, website 108 and other data providers over the Internet 109. In one or more embodiments, the processor 101 bidirectionally communicates with the plurality of external servers 105 using the bidirectional communication link 102, accepts a first set of a plurality of sports league data from the first user 103, and accepts a second set of a plurality of sports league data from the plurality of external servers 105 associated with the one or more additional users 104. In one or more embodiments, the plurality of external servers 105 are in bidirectional communication with the one or more additional users 104, depicted by element 110. The bidirectional communication link 102 may include a receiver, transmitter, transceiver, antenna, USB cable, any other type of wireless link, any other type of hardwired communication link, or any combination thereof. In at least one or more embodiments, the processor 101 may accept a first set of a plurality of sports league data from the first user 103 using physical software input using a mobile computer 106 or a web-based application from a website 108, from a database or information provide over the Internet 109, or voice recognition input using the mobile computer, processor 101 or the web-based application, or in any other manner. In one or more embodiments of in the invention, the plurality of external servers 105 may be one or more of at least one television network server, at least one web-based league data server and at least one mobile computer league data, or any other computer system configured to host at least one fantasy league and data associated therewith.

By way of one or more embodiments, each of the first set of a plurality of sports league data and the second set of a plurality of sports league data includes at least one or more leagues the first user 103 and the one or more additional users 104 are associated with respectively, and wherein each of the one or more leagues the first user 103 and the one or more additional users 104 are associated with include one or more fantasy teams, one or more players within each of the one or more fantasy teams, player statistics associated with each of the one or more players and player achievements associated with each of the one or more players.

Figure 2:
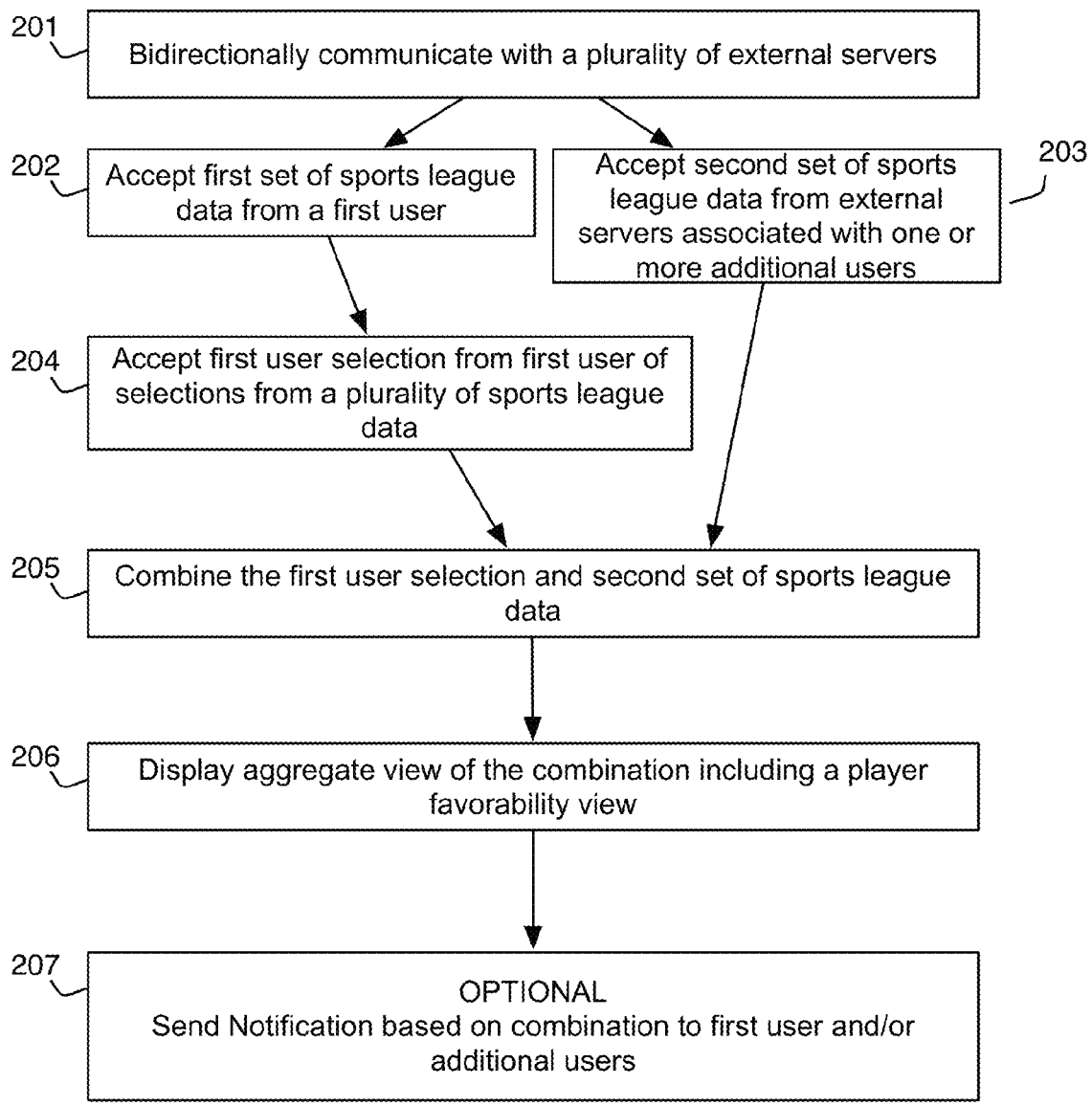
FIG. 2 shows a flow chart for an embodiment of the method that displays favorability relative to the user's fantasy players versus additional users.

FIG. 2 shows a flow chart for an embodiment of the method that displays favorability relative to the user's fantasy players versus additional users. In at least one or more embodiments, at step 201 the processor 101 bidirectionally communicates with the plurality of external servers 105, at step 202 the processor 101 may accept a first set of sports league data from the first user 103, and at step 203 the processor 101 may accept a second set of sports league data from the plurality of external servers 105 associated with the one or more additional users 104. In at least one embodiment of the invention, steps 202 and 203 may occur simultaneously, or may occur individually at separate times. In one or more embodiments, after the processor 101 accepts the first set of sports league data from the first user 103, the processor may accept a first user selection from the first user 103 from the plurality of sports league data at step 204. By way of one or more embodiments, at step 205, the processor may combine the first user selection from step 204 and the second set of a plurality of sports league data from the plurality of external servers from step 203, and may display an aggregate view of the combination at step 206, including, for example, a player favorability view. In one or more embodiments of the invention, the processor 101 may optionally send a notification to the first user 103 at step 207 and send a notification to the one or more additional users 104, based on the combination from step 206.

In at least one embodiment, the processor 101 may send a notification to the first user 103 or the one or more additional users 104 using sound notification, tactile notification, web-based notification, mobile-phone based notification and application based notification, or any combination thereof, such as via an e-mail notification, a ringtone alert, a vibration, a text message, or a pop-up alert on one or more devices associated with the first user 103 and/or the one or more additional users 104.

By way of one or more embodiments, the first user selection may include one or more selections from the first set of a plurality of sports league data, and wherein the first user selection may include the one or more leagues the first user 103 is associated with and the one or more players the first user 103 has previously selected within the one or more leagues.

In at least one or more embodiments of the invention, the processor 101 may also accept a second user selection from the first user 103, such that the second user selection could include one or more additional selections from the first set of a plurality of sports league data, different from the first user selection. For example, the first user selection may include a selection of one or more fantasy teams the first user is associated with, and the second user selection may include one or more players within the one or more fantasy teams, or which leagues to show in an aggregated view. As one of ordinary skill in the art would appreciate, any other selection combination within the first set of a plurality of sports league data is within the scope of the invention.

By way of one or more embodiments, each of the first set of a plurality of sports league data and the second set of a plurality of sports league data may include one or more of American or Australian rules football, basketball, soccer, hockey, baseball, bowling, or any other sport, game or notoriety fantasy league data, or combination of fantasy league data as known to one of ordinary skill in the art. In one or more embodiments, each of the first set of a plurality of sports league data and the second set of a plurality of sports league data may include one or more of live-feedback data during a sports game and previous data attained during previous sports games.

For example, during a live sports game, live-feedback data may include points scored by one or more players and/or yardage attained by one or more players using the one or more of the plurality of external servers 105, which is automatically obtained by the fantasy league aggregation system for example via processor 101 or any other processor on any other computer as per FIG. 1, to automatically update information. In one or more embodiments, the processor 101 may automatically update the player favorability view using the second set of sports league data from one or more of the plurality of external servers 105, such as by updating one or more of a first player category, a second player category, a third player category, a fourth player category and a fifth player category; as will be further described below. Embodiments may poll the external servers 105 or sports feed websites or receive event based messages or any combination thereof in order to obtain the performance data. Embodiments may then display a fine-grained five category favorability rating or may display a coarse-grained two category favorability rating or both, as will be further described below.

In one or more embodiments of the invention, the aggregate view may include the player statistics of the one or more players associated with the first user 103, a combination of the player achievements from the first user selection and from the second set of a plurality of sports league data from the plurality of external servers associated with the one or more additional users 104, and a player favorability view of the one or more players. By way of one or more embodiments, the player favorability view may include a plurality of player strength categories associated with each player of the one or more players, such that the plurality of player strength categories includes the first player category, the second player category, the third player category, the fourth player category and the fifth player category.

FIG. 3 shows an exemplary favorability display and league display, or favorability view and league view, associated with the user's fantasy players across multiple leagues versus additional user's fantasy players. The figure displays the exemplary favorability view and league display on a computer screen, however it is noted that any screen may be used to display the player favorability views and league views, including but not limited to desktop computers, laptop computers, tablet computers, Smart phones, or any other type of computer.

As shown in FIG. 3, in at least one embodiment of the invention, the processor 101, or again any other processor shown in FIG. 1, may display a league view, such that the league view may include a list of one or more leagues 301, from the one or more leagues. The list of one or more leagues 301 includes two leagues associated with the first user 103, "LEAGUE 1" and "LEAGUE 2", however it is noted that any number of leagues remains within the scope of the invention as one of ordinary skill in the art would appreciate. The processor 101 may also enable the first user to select one or more leagues, from the list of leagues 301, to view in the aggregated league view shown in area 302 and deselect one or more leagues from the list to not view in the aggregated league view. This enables selectively viewing of subsets of all of the fantasy leagues a user is in to see if overall performance is better or worse in subset of the leagues. For example, if the first user is associated with three leagues, the first user is able to select a first league and a second league to view in the league view, and deselect a third league. In addition, for example, in order to compare sports league data, the first user 103, such as "USER XYZ", is able to deselect any of the first league or second league, and select the third league, or select all three leagues. FIG. 3 depicts wherein "LEAGUE 1" and "LEAGUE 2", of "USER XYZ" are on, however "USER XYZ" may deselect one or more of the leagues to turn the one or more leagues off and not display the deselected one or more leagues in the league view. Furthermore, according to at least one embodiment of the invention, as the first user 103 selects or deselects one or more leagues to view in the league view, the player favorability view changes accordingly, by changing and updating a display of the one or more players in each of the selected leagues the first user selects, a display of one or more bench players in each of the selected leagues the first user selects and a display of one or more opponent players in each of the selected leagues the first user selects.

This enables the user to determine which leagues need attention, e.g., trades to improve performance in for example. In addition, embodiments of the system may display each week or day of the league performance depending on the game intervals for the specific sport, so that the user may scroll back and forward in time to view favorability of players over time for example see FIGS. 4 and 5.

According to one or more embodiments, the league view may include a display of time of contest (not shown), the display of the one or more players in each of the selected leagues the first user selects, the display of one or more active or optionally bench players in each of the selected leagues the first user selects and the display of one or more opponent players in each of the selected leagues the first user selects, as shown at 302. In one or more embodiments of the invention, the display of the one or more players 302 includes a player name, a player team, a player position and player points for each of the one or more players, and the display of one or more active or optionally bench players includes a player name, a player team and a player position for each of the one or more players, and the display of one or more opponent players includes a player name, a player team, a player position and a player points for each of the one or more players. It is noted wherein each of the displays may further include any other sports league data information pertinent to the type of sport the first user is associated with. For example, one or more sports may not necessarily include any bench players, whereas other sports may include additional type of players such as a next batter up in baseball.

According to one or more embodiments, each player category of the five player categories provides a list of favorability ratings based on the first user's 103 selection of one or more players versus one or more players from the one or more additional users 104. In at least one or more embodiments, the first player category 303a, shown as a "++" list that lists players that are for the first user and are only on one or more fantasy teams from one or more of fantasy teams associated with the first user and not the one or more additional users. The second player category 303b, shown as a "+" list that lists players that are favorable to the first user and are on one or more fantasy teams from the one or more fantasy teams associated with the first user than are on one or more fantasy teams from the one or more fantasy teams associated with the one or more additional users. The third player category 303c, shown as a zero or "0" list that lists players that are neutral to the first user and are on the same number of fantasy teams from the one or more fantasy teams associated with the first user and the one or more additional users. The fourth player category 303d, shown as a "−" list that lists players that are unfavorable to the first user and are on less fantasy teams from the one or more fantasy teams associated with the first user than are on fantasy teams from the one or more fantasy teams associated with the one or more additional users. The fifth player category 303e, shown as a "− −" list that lists players that are against the first user and are only on fantasy teams from the one or more fantasy teams associated with the first user and not associated with the one or more additional users. Any other user interface elements or groupings, colors, bold fonts or any other display technique may be utilized to convey the player categories as one skilled in the art will recognize. Other brief views may be utilized of "more for" or "more against" such that a coarser grained "cheer" or "no cheer" indication or favorability rating may be provided to the user alone or in combination with the five player category fine-grained favorability rating.

According to at least one embodiment of the invention, the player favorability view may include a player statistics view.

The play statistics view, for example, may have the player statistics associated with one or more of the players, and the player statistics associated with each of the one or more players may include a player name, the player team, the player position and a number of leagues the player is competing in, as shown in 302 such as with Rodgers, Manning, Ryan, Brees, etc. under the Quarterback (QB) position. In one or more embodiments, the number of leagues a player is competing in may be determined from one or more of the first user selection from the first user 103 and the second user selection from the first user 103, and may also be determined and selected by the first user 103 using a user input and/or automatically generated using the one or more of the plurality of external servers 105.

By way of one or more embodiments, the player favorability view may also include a player achievements view that may contain player achievements associated with one or more of the players. The player achievements associated with each of the one or more players may include one or more of a player yardage, the player points scored during a game, the player catches, the player runs, the player passes, the player interceptions, or any other offensive or defensive play the player attains, or any other statistics related to the specific sport for example, or any combination thereof as one of ordinary skill in the art would recognize.

Figure 4:
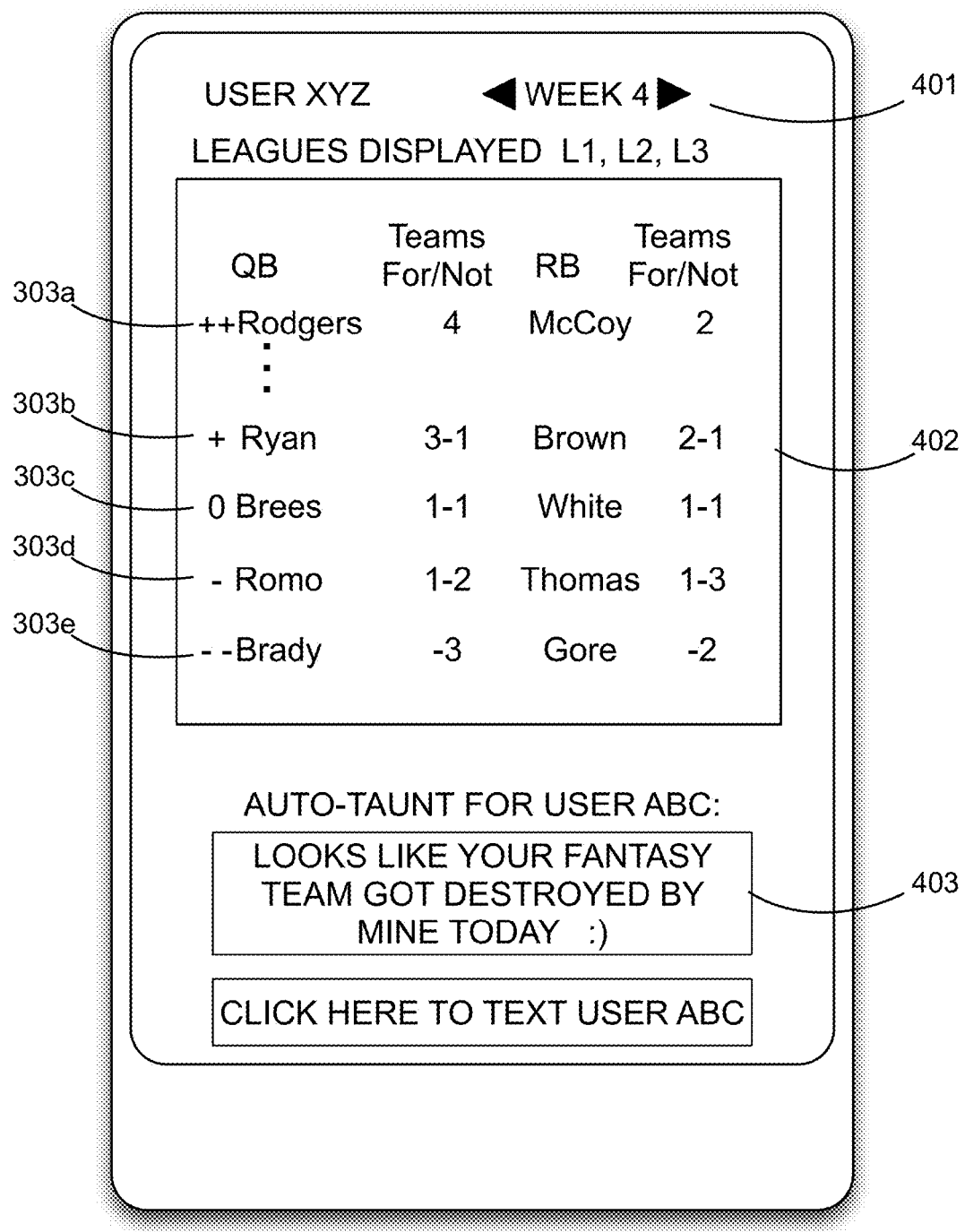
FIG. 4 shows an exemplary mobile version of the interface with fine-grained favorability display and exemplary taunting message.

FIG. 4 shows an exemplary mobile version of the interface with fine-grained favorability display and exemplary taunting message. The figure displays the exemplary favorability view and league display on a mobile phone screen, however it is noted that any screen may be used to display the player favorability views and league views, including but not limited to desktop computers, laptop computers, tablet computers, Smart phones, or any other type of computer. The display includes the user associated with the league view and player favorability view as "USER XYZ", the list of leagues displayed as "LEAGUES DISPLAYED L1, L2, L3" and the week number 401, such as "WEEK 4", associated with the player favorability view and league view. In one or more embodiments, the week number 401 allows a user to scroll forward and backward between weeks to compare the data from one week to another week, so that the user may scroll back and forward in time to view favorability of players over time. Element 402 is a display of the one or more players in each of the selected leagues the first user selects with player name, player team, player position and a player points for each of the one or more players, for example using a fine-grained five category view. Display 402 may also include a display of one or more active or optionally bench players includes a player name, a player team and a player position for each of the one or more players, and the display of one or more opponent players includes a player name, a player team, a player position and a player points for each of the one or more players.

Other embodiments may also display an informatory message during or after a performance that enables the user to cheer or not cheer or otherwise inform additional user's as to the first user's fantasy team performance, in area 403, e.g., one or more taunting messages for the first user 103 to relay or that is automatically texted or otherwise transmitted to the additional one or more users 104 such as "User XYZ's Fantasy Team moves up two spots in your Fantasy League based on your Fantasy Players relatively dismal performance today", or "Looks like your fantasy team got destroyed by mine today", or any other taunting or informatory message, such as CHEER NOW, Player "Rodgers" has just scored and is "for" you. In one or more embodiments, the one or more taunting messages may be automatically relayed using live-feedback obtained data during a live sports game and/or from previous data attained during previous sports games, as discussed previously and/or otherwise tweeted or broadcast to any existing social media sites. Auto-taunt messages may be generated during a game, after a game, after a game day, after a game week or at any other interval in keeping with the spirit of the invention. In addition, once a player has finished a game, the system may display a symbol, e.g., an "F" for "Final", next to the player's name, or alternatively, the player may be eliminated from the display in order to show only current players worthy of cheering or not cheering for, or otherwise providing negative feedback based on the potential hostility of the current crowd viewing the game proximal to the user.

Figure 5:
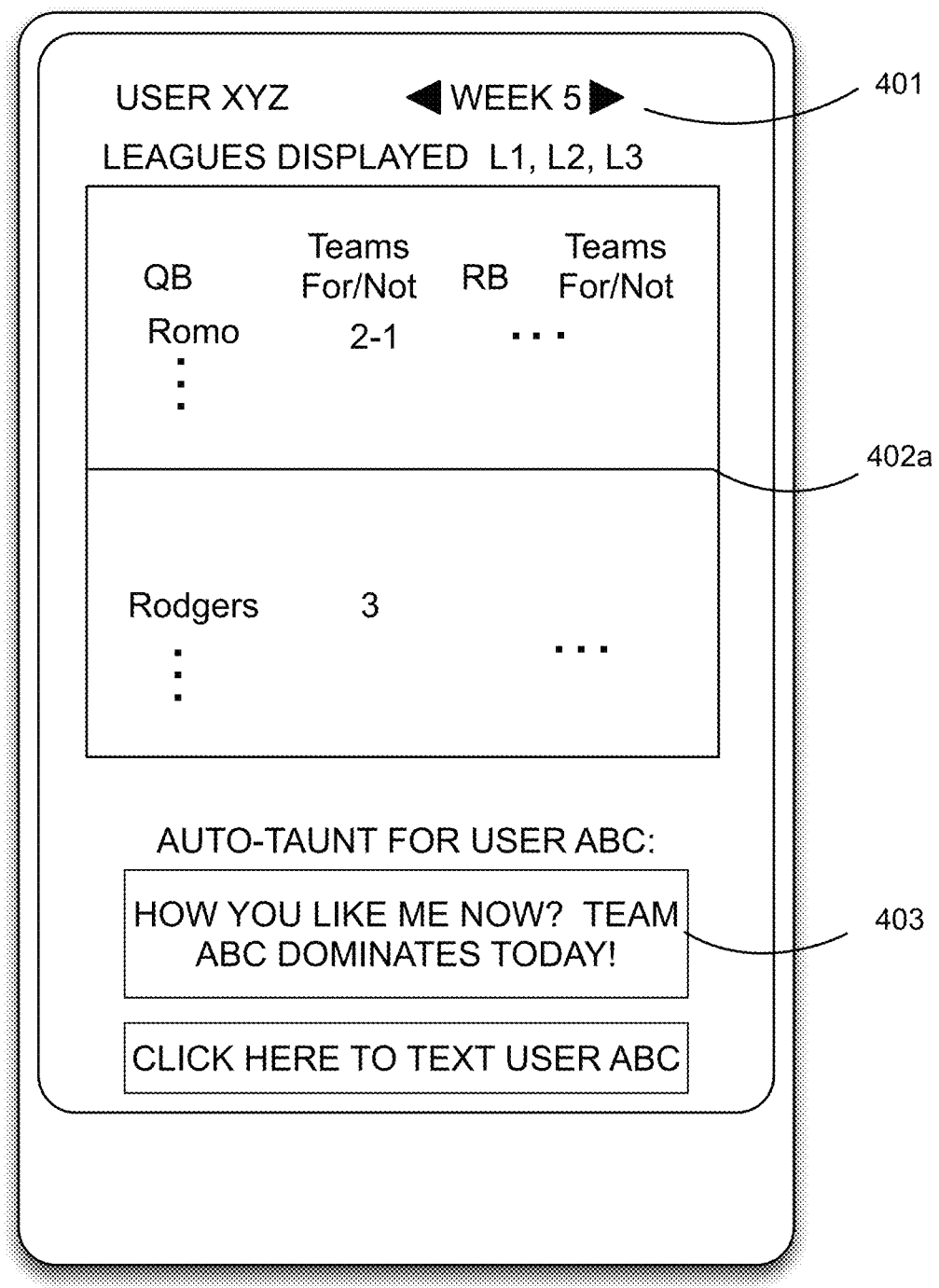
FIG. 5 shows an exemplary interface with a coarse-grained favorability display and exemplary taunting message.

In addition, according to one or more embodiments of the invention, processor 101 displays a "CLICK HERE TO TEXT USER" button, that allows a first user 103, such as "USER XYZ" of FIG. 4, and/or FIG. 5, to text the one or more additional users 104, such as "USER ABC" of FIG. 4, a manual taunting message.

FIG. 5 shows an exemplary interface with a coarse-grained favorability display and exemplary taunting message. The figure displays the exemplary favorability view and league display on a mobile phone screen, however it is noted that any screen may be used to display the player favorability views and league views, including but not limited to desktop computers, laptop computers, PDAs, Smart phones, PC tablets, etc. FIG. 5 displays the user associated with the league view and player favorability view as "USER XYZ", the list of leagues displayed as "LEAGUES DISPLAYED L1, L2, L3" and the week number 401, as "WEEK 5", associated with the player favorability view and league view. In one or more embodiments, the week number 401 allows a user to scroll forward and backward between weeks to compare the data from one week to another week, so that the user may scroll back and forward in time to view favorability of players over time.

The display in FIG. 5, relating to Week 5 for example, depicts updated player favorability information under each category, player, team position, etc., compared to the display shown in FIG. 4 relating to Week 4. In addition, as games go final, the players listed may also be designated as such as previously discussed or eliminated from the display. Element 402a is an updated display of the one or more players in each of the selected leagues the first user selects with player name, player team, player position and a player points for each of the one or more players. Display 402a may also include a display of one or more active or optionally bench players includes a player name, a player team and a player position for each of the one or more players, and the display of one or more opponent players includes a player name, a player team, a player position and a player points for each of the one or more players. In addition, one or more embodiments of the invention enable the user to switch between display 402 and 402a, i.e., fine-grained category display to coarse-grained category display by double tapping in the center of the screen for example. Any other gesture, such as shaking the mobile computer may be utilized to scroll through taunting messages or switch between display types.

For example, according to Week 4 of FIG. 4, QB Romo is rated at "1-2" suggesting that the first user 103 or the one or more additional users 104, should not cheer for Romo in Week 4. According to Week 5 of FIG. 5, QB Romo rating has changed to "2-1", suggesting that the first user 103 or the one or more additional users 104, may begin cheering for Romo in Week 5. In another example, according to Week 4 of FIG. 4, QB Rodgers is at "4", suggesting that the first user 103 or the one or more additional users 104, should cheer for Rodgers in Week 4. According to Week 5 of FIG. 5, QB Rodgers is now at "3", suggesting that the first user 103 or the one or more additional users 104 should not cheer for Rodgers in Week 5. Although the provided examples relate specifically to QB positions, as one of ordinary skill in the art would appreciate, comparisons, differences and updates are applicable to all players of all positions, teams and leagues. With multiple leagues and large numbers of players with respect to additional users, embodiments of the invention enable the user to know when to cheer for a player performance or not.

Figure 6:
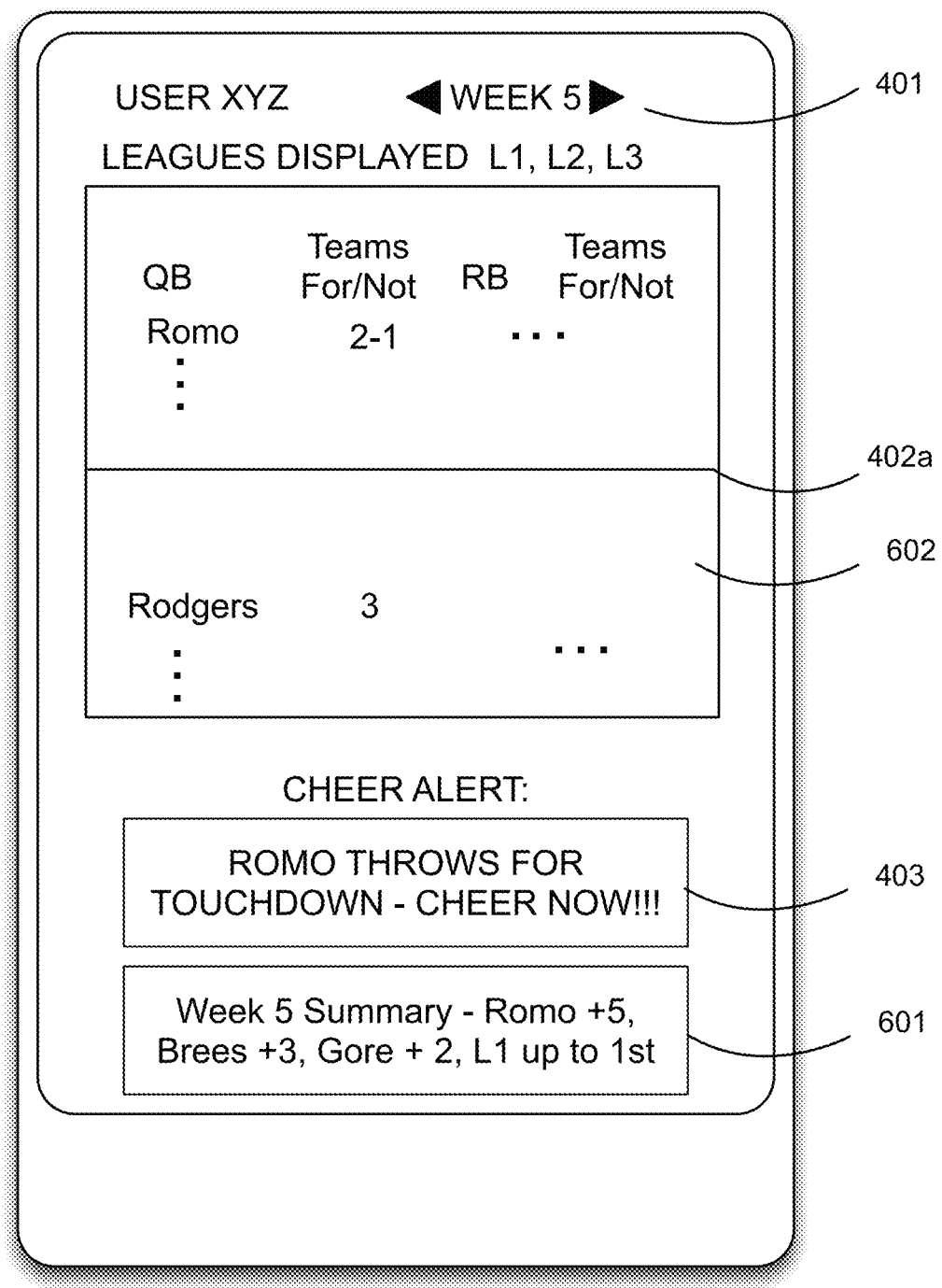
FIG. 6 shows an exemplary interface with a coarse-grained favorability display and cheer alert and snapshot area.

FIG. 6 illustrates the display of FIG. 5 as a player performance is shown in the information area 403. For example, as processor 101 detects a player performance by scanning the servers 105 or otherwise parsing webpages or in any other manner, if the player performance helps the user, then a cheer alert may be shown in area 403, along with a vibration, or sound such as a cheering sound, or any combination thereof on the computer associated with the user, e.g., mobile device 106 after processor 101 pushes the notification to the mobile device or after the mobile device polls the processor for example. In one or more embodiments, processor 101 may email or text user 103 as well, alone or in combination with the cheer alert displayed in area 403. In addition, as games go final, players may be removed from the category lists shown in area 602 or anywhere else on the display. In addition, as shown in area 601a summary report or other final snapshot of the stats of the game, day, week or other interval may be shown, or otherwise emailed or texted to the user. This enables a user to quickly find out the summary of the league play after arriving from a trip for example, or otherwise being out of communication range during play for example. The snapshot or summary shown in area 601 may include games currently being played, to be played, e.g., a list of players for/against a user right before a game to remind the user who to potentially cheer for, or a final snapshot of the game, day, week or other interval as previously discussed. Thus embodiments of the invention enable a user to rapidly determine whether to cheer or not cheer a particular player performance based on involvement in multiple fantasy leagues whether sport, game or notoriety related or with respect to any other type of fantasy league.

While the invention herein disclosed has been described by means of specific embodiments and applications thereof, numerous modifications and variations could be made thereto by those skilled in the art without departing from the scope of the invention set forth in the claims.

What is claimed is:

1. A fantasy league aggregation system comprising:
a processor;
wherein said processor is configured to
bidirectionally communicate with a plurality of external servers via a bidirectional communication link;
accept a first set of a plurality of sports league data from a first user;
accept a second set of a plurality of sports league data from said plurality of external servers associated with one or more additional users;
wherein each of said first set of a plurality of sports league data and said second set of a plurality of sports league data comprise at least one or more leagues said first user and said one or more additional users are associated with respectively, and
wherein each of said one or more leagues said first user and said one or more additional users are associated with comprise one or more fantasy teams, one or more players within each of said one or more fantasy teams, player statistics associated with each of said one or more players and player achievements associated with each of said one or more players;
accept a first user selection from said first user, wherein said first user selection comprises one or more selections from said first set of a plurality of sports league data;
combine said first user selection and said second set of a plurality of sports league data from said plurality of external servers;
wherein said first user selection comprises said one or more leagues said first user is associated with and said one or more players said first user is associated with within said one or more leagues;
display an aggregate view of said combination wherein said aggregate view comprises said player statistics of said one or more players associated with said first user;
a combination of said player achievements from said first user selection and from said second set of a plurality of sports league data from said plurality of external servers associated with said one or more additional users; and
a player favorability view of said one or more players;
wherein said player favorability view comprises a plurality of player strength categories associated with each player of said one or more players, and
wherein said plurality of player strength categories comprise
a first player category that lists players that are for said first user and are only on one or more fantasy teams from one or more of fantasy teams associated with said first user and not said one or more additional users,
a second player category that lists players that are favorable to said first user and are on one or more fantasy teams from said one or more fantasy teams associated with said first user than are on one or more fantasy teams from said one or more fantasy teams associated with said one or more additional users,
a third player category that lists players that are neutral to said first user and are on the same number of fantasy teams from said one or more fantasy teams associated with said first user and said one or more additional users, and
a fourth player category that lists players that are unfavorable to said first user and are on less fantasy teams from said one or more fantasy teams associated with said first user than are on fantasy teams from said one or more fantasy teams associated with said one or more additional users,
a fifth player category that lists players that are against said first user and are only on fantasy teams from said one or more fantasy teams associated with said first user and not associated with said one or more additional users.

2. The fantasy league aggregation system of claim 1, wherein said first user selection from said first user comprises one or more of a user selection of one or more players and a user selection of one or more leagues from said one or more leagues said first user is associated with.

3. The fantasy league aggregation system of claim 1, wherein said plurality of external servers comprise one or more of at least one television network server, at least one web-based league data server and at least one mobile computer league data.

4. The fantasy league aggregation system of claim 1, where said processor is further configured to accept a second user selection from said first user, wherein said second user selection comprises one or more additional selections from said first set of a plurality of sports league data, different from said first user selection.

5. The fantasy league aggregation system of claim 4, wherein said first user selection or said second user selection comprises a selection of a plurality of leagues from said one or more leagues said user is associated with.

6. The fantasy league aggregation system of claim 1, wherein each of said first set of a plurality of sports league data and said second set of a plurality of sports league data further comprise one or more of American football sports league data, basketball sports league data, soccer sports league data, hockey sports league data, baseball sports league data and bowling sports league data.

7. The fantasy league aggregation system of claim 1, wherein each of said first set of a plurality of sports league data and said second set of a plurality of sports league data further comprise one or more of live-feedback data during a sports game and previous data attained during previous sports games.

8. The fantasy league aggregation system of claim 1, wherein said player favorability view further comprises a player statistics view comprising said player statistics associated with one or more of said players, wherein said player statistics associated with each of said one or more players comprise a player name, said player team, said player position and a number of leagues said player is competing in.

9. The fantasy league aggregation system of claim 1, wherein said player favorability view further comprises a player achievements view comprising said player achievements associated with one or more of said players, wherein said player achievements associated with each of said one or more players comprise one or more of a player yardage, said player points scored during a game, said player catches, said player runs, said player passes and said player interceptions.

10. The fantasy league aggregation system of claim 7, wherein said number of leagues said player is competing in is determined from one or more of said first user selection from said first user and said second user selection from said first user.

11. The fantasy league aggregation system of claim 1, wherein said processor is further configured to display a league view, wherein said league view comprises a list of one or more leagues from said one or more leagues, and wherein said processor is further configured to enable said first user to select one or more leagues from said list to view in said league view and deselect one or more leagues from said list to not view in said league view.

12. The fantasy league aggregation system of claim 10, wherein said league view further comprises a display of time of contest, a display of said one or more players in each of said selected leagues said first user selects, a display of one or more active players in each of said selected leagues said first user selects and a display of one or more opponent players in each of said selected leagues said first user selects.

13. The fantasy league aggregation system of claim 11, wherein said display of said one or more players comprises a player name, a player team, a player position and a player points for each of said one or more players, and said display of one or more active players comprises a player name, a player team and a player position for each of said one or more players, and said display of one or more opponent players comprises a player name, a player team, a player position and a player points for each of said one or more players.

14. The fantasy league aggregation system of claim 1, wherein said processor is further configured to automatically update said player favorability view using said second set of sports league data from one or more of said plurality of external servers.

15. The fantasy league aggregation system of claim 14, wherein said processor configured to automatically update said player favorability view comprises updating one or more of said first player category, said second player category, said third player category, said fourth player category and said fifth player category.

16. The fantasy league aggregation system of claim 15, wherein said processor configured to automatically update said player favorability view comprises updating said player favorability view using live-feedback from said one or more of said plurality of external servers.

17. The fantasy league aggregation system of claim 1, wherein said processor is further configured to operate on a web-based application or a mobile computer.

18. The fantasy league aggregation system of claim 1, wherein said processor is further configured to provide or transmit a message to said one or more additional users regarding fantasy league performance.

19. A fantasy league aggregation system comprising:
a processor;
wherein said processor is configured to
bidirectionally communicate with a plurality of external servers via a bidirectional communication link;
accept a first set of a plurality of sports league data from a first user;
accept a second set of a plurality of sports league data from said plurality of external servers associated with one or more additional users;
wherein each of said first set of a plurality of sports league data and said second set of a plurality of sports league data comprise at least one or more leagues said first user and said one or more additional users are associated with respectively, and
wherein each of said one or more leagues said first user and said one or more additional users are associated with comprise one or more fantasy teams, one or more players within each of said one or more fantasy teams, player statistics associated with each of said one or more players and player achievements associated with each of said one or more players;
accept a first user selection from said first user, wherein said first user selection comprises one or more selections from said first set of a plurality of sports league data;
combine said first user selection and said second set of a plurality of sports league data from said plurality of external servers;
wherein said first user selection comprises said one or more leagues said first user is associated with and said one or more players said first user is associated with within said one or more leagues;
display an aggregate view of said combination wherein said aggregate view comprises said player statistics of said one or more players associated with said first user;
a combination of said player achievements from said first user selection and from said second set of a plurality of sports league data from said plurality of external servers associated with said one or more additional users; and
a player favorability view of said one or more players;

wherein said player favorability view comprises a plurality of player strength categories associated with each player of said one or more players, and wherein said plurality of player strength categories comprise
- a first coarse-grained player category that lists
  - players that are for said first user and are only on one or more fantasy teams from one or more of fantasy teams associated with said first user and not said one or more additional users
  or
  - players that are favorable to said first user and are on one or more fantasy teams from said one or more fantasy teams associated with said first user than are on one or more fantasy teams from said one or more fantasy teams associated with said one or more additional users;
- a second coarse-grained player category that lists
  - players that are unfavorable to said first user and are on less fantasy teams from said one or more fantasy teams associated with said first user than are on fantasy teams from said one or more fantasy teams associated with said one or more additional users,
  or
  - players that are against said first user and are only on fantasy teams from said one or more fantasy teams associated with said first user and not associated with said one or more additional users.

20. The fantasy league aggregation system of claim 19, wherein said processor is further configured to provide or transmit a message to said one or more additional users regarding fantasy league performance.

\* \* \* \* \*